T. D. VINCENT.
LAWN MOWER.
APPLICATION FILED AUG. 28, 1913.
1,115,350.
Patented Oct. 27, 1914.
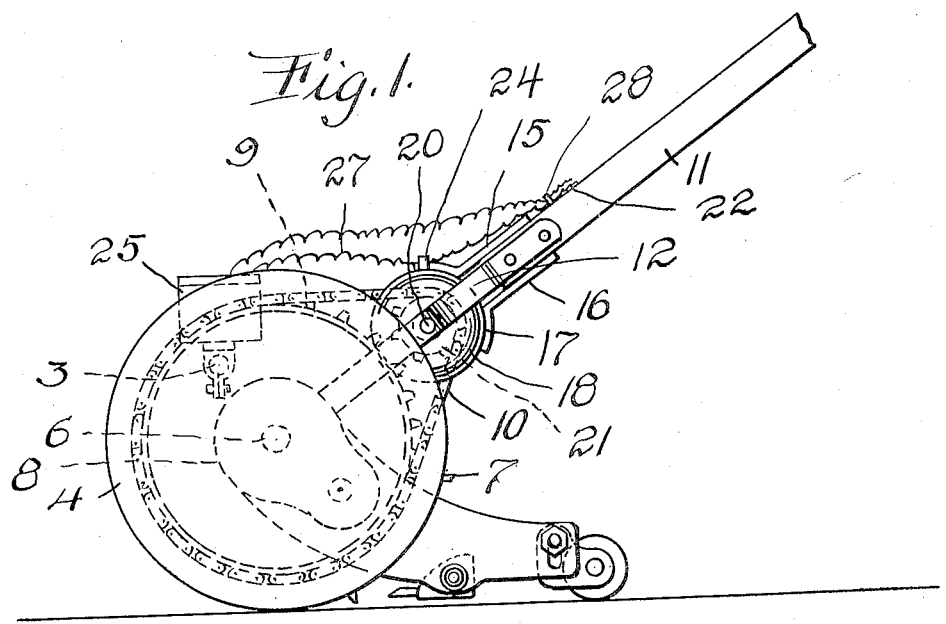
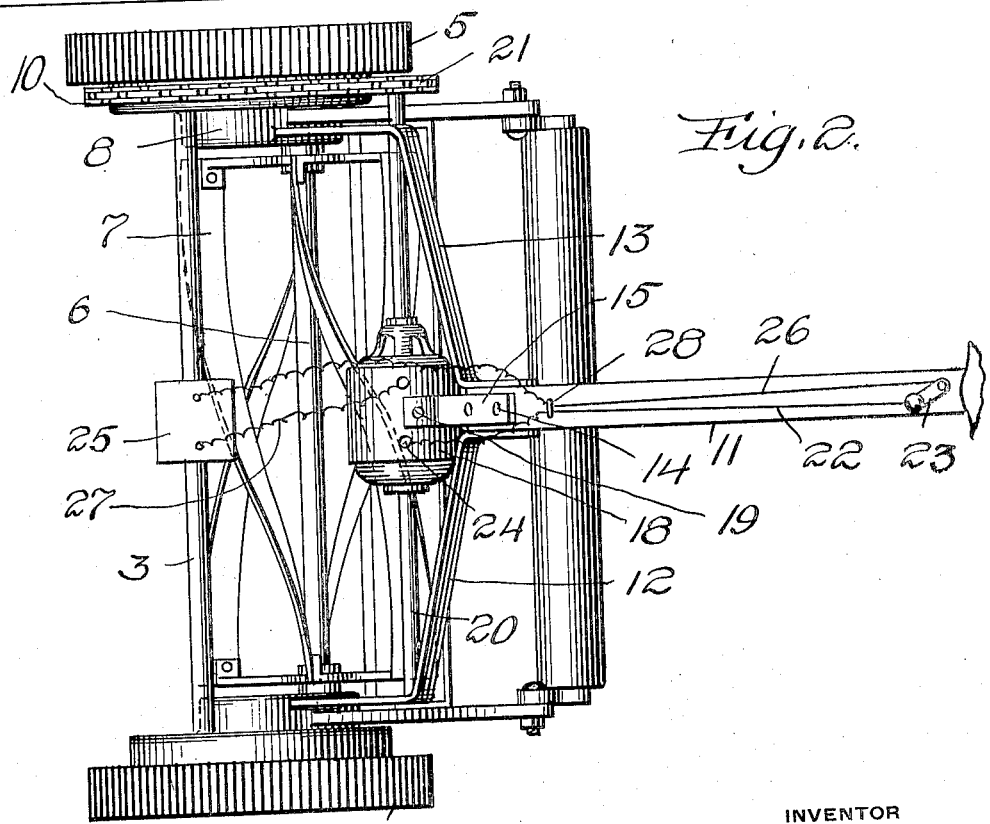
WITNESSES
Samuel Payne
Max N. Sivlony
INVENTOR
T. D. Vincent.
By Henry C. Evert
ATTORNEY

UNITED STATES PATENT OFFICE.

TIMOTHY D. VINCENT, OF PITTSBURGH, PENNSYLVANIA.

LAWN-MOWER.

1,115,350.  Specification of Letters Patent.  Patented Oct. 27, 1914.

Application filed August 28, 1913. Serial No. 787,227.

*To all whom it may concern:*

Be it known that I, TIMOTHY D. VINCENT, a citizen of the United States of America, residing at Pittsburgh, in the county of Allegheny and State of Pennsylvania, have invented certain new and useful Improvements in Lawn-Mowers, of which the following is a specification, reference being had therein to the accompanying drawing.

This invention relates to lawn mowers, and has for its object to provide a device of such class with means, in a manner as hereinafter set forth for driving not only the mower, but also the knives thereby dispensing with the manual pushing or propelling of the mower as is now generally the case.

Primarily the invention resides in the mounting of an operating means for the mower upon the handle bracket and coupling up an operating means with one of the wheels of the mower whereby a safe propeller mower is set up.

Further objects of the invention are to provide an operating means for a lawn mower which is simple in its construction and arrangement, strong, durable, efficient and convenient in its use and comparatively inexpensive to attach to the ordinary form of lawn mowers.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications can be resorted to which come within the scope of the claims hereunto appended.

In the drawings wherein like reference characters denote corresponding parts throughout the several views, Figure 1 is a side elevation of a lawn mower showing an operating means therefor, in accordance with this invention attached thereto, and Fig. 2 is a top plan view of a lawn mower showing an operating means therefor in accordance with this invention connected therewith.

Referring to the drawings by reference characters, 3 denotes the mower frame, 4, 5 the wheels, 6 the knife shaft, 7 the knives, 8 the gear boxes containing the gears driven from the wheel 5 for operating the knife shaft. The foregoing is of known construction with exception of the wheel 5, as the latter is provided on its inner face with a circular sprocket wheel 9, which is engaged by an endless chain 10 for driving the wheel 5, under such conditions propelling the mower.

The reference character 11 denotes the handle bar and which has secured to its inner end a pair of oppositely disposed brackets 12, 13 which are loosely mounted upon the knife shaft. Secured to the inner end of the handle bar 11, by the holdfast devices 14 are a pair of retaining members 15, 16 which project forwardly from said handle bar 11 and have the projecting portions thereof curved as at 17. Positioned against the inner end of the handle bar 11, and abutting against the curved projecting portions 17 of the retaining members 15 and 16 is an electric motor 18, which is secured to the curved portions 17 by holdfast devices 19.

The reference character 20 denotes the motor shaft which is journaled at one end in the bracket 12, and at its other end projects from the bracket 13, and is provided with a sprocket wheel 21, which engages and drives the chain 10.

The reference character 22 denotes a circuit wire leading from a contact, not shown, adapted to be engaged by a switch 23. The circuit wire 22 is connected to the motor as at 24. Leading from the switch 23 to a source of electrical energy 25 is a circuit wire 26. The source of electrical energy 25 is carried by the front bar of the frame 3. Leading from the motor to the source of electrical energy 25 is a circuit wire 27. A staple 28 connects the circuit wire 22 and 26 to the handle bar 11. The switch 23 is utilized for opening and closing the motor circuit to drive or discontinue the operation of the mower.

What I claim is:—

1. In a lawn mower, the combination with a mower frame, a handle bar, brackets for connecting the bar with a motor body, brackets connecting the handle bar with the mower frame, an electric motor connected to the inner end of said handle bar and having a shaft journaled at one end in one of said brackets and extending through the other of said handle bar brackets, a source of electrical energy carried by the motor frame, and a circuit between said motor and said source of electrical energy, a switch in said circuit for opening and closing the circuit, and a driving connection between said motor shaft and one of the wheels of the mower.

2. In a lawn mower, the combination with a mower frame, a handle bar and one of the wheels of the mower, of a source of electrical energy carried by said frame, an electric motor connected to the handle, a driving connection between the motor shaft and said wheel, and circuit forming connections between said source of electrical energy and the motor, said connections including a switch for opening and closing the circuit.

3. In a lawn mower, an electric motor secured to the inner end of the handle bar and having its shaft extended, a source of electrical energy carried by the mower frame, a driving connection between one of the wheels of the mower and said shaft, circuit forming connections between the source of electrical energy and said motor, and a switch carried by the handle bar for opening and closing the circuit.

In testimony whereof I affix my signature in the presence of two witnesses.

TIMOTHY D. VINCENT.

Witnesses:
OLLIE M. VINCENT,
A. G. VINCENT.